(12) United States Patent
Yu et al.

(10) Patent No.: US 8,576,232 B2
(45) Date of Patent: Nov. 5, 2013

(54) APPARATUS, METHOD, AND SYSTEM FOR DRAFTING MULTI-DIMENSIONAL DRAWINGS

(75) Inventors: Feng Yu, Irvine, CA (US); Bo Kyoung Moon, Tustin, CA (US); Jeffrey A. Weidman, Macomb Township, Macomb County, MI (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2914 days.

(21) Appl. No.: 10/039,187

(22) Filed: Dec. 31, 2001

(65) Prior Publication Data
US 2003/0122816 A1    Jul. 3, 2003

(51) Int. Cl.
G06T 11/20 (2006.01)
G06T 17/00 (2006.01)
G06T 15/10 (2011.01)
G06F 17/00 (2006.01)

(52) U.S. Cl.
USPC .......... 345/442; 345/418; 345/419; 345/427; 345/441

(58) Field of Classification Search
USPC .......... 345/418, 419, 441, 442, 427
See application file for complete search history.

(56) References Cited

U.S. PATENT DOCUMENTS

| | | | | |
|---|---|---|---|---|
| 4,829,456 A | * | 5/1989 | Joonishi et al. | 345/419 |
| 5,317,682 A | * | 5/1994 | Luken, Jr. | 345/442 |
| 5,345,546 A | * | 9/1994 | Harada et al. | 345/442 |
| 5,428,718 A | * | 6/1995 | Peterson et al. | 345/423 |
| 5,459,821 A | * | 10/1995 | Kuriyama et al. | 345/420 |
| 5,497,451 A | * | 3/1996 | Holmes | 345/420 |
| 5,510,995 A | * | 4/1996 | Oliver | 700/182 |
| 5,557,719 A | * | 9/1996 | Ooka et al. | 345/441 |
| 5,592,599 A | * | 1/1997 | Lindholm | 345/427 |
| 5,594,852 A | * | 1/1997 | Tankelevich | 345/441 |
| 5,602,979 A | * | 2/1997 | Loop | 345/423 |
| 5,608,855 A | * | 3/1997 | Harashima | 345/442 |
| 5,619,625 A | * | 4/1997 | Konno et al. | 345/419 |
| 5,742,295 A | * | 4/1998 | Lindholm | 345/427 |

(Continued)

OTHER PUBLICATIONS

Ohbuchi, R.; Masuda, H.; Aono, M.; "A shape-preserving data embedding algorithm for NURBS curves and surfaces", Proceedings of Computer Graphics International, Jun. 7-11, 1999, pp. 180-187.*

(Continued)

*Primary Examiner* — Ulka Chauhan
*Assistant Examiner* — Roberta D Prendergast (57) ABSTRACT

According to one embodiment of the invention, a method for interfacing with a surface within a computer-aided drawing environment includes determining that a plurality of curves operable to define the surface constitute a P×1 surface condition. A P×1 surface condition is defined by a number of first curves equal to P and only one second curve. P is an integer greater than zero. The method also includes converting the P×1 surface condition into an N×M surface condition in response to determining that a plurality of curves constitute a P×1 surface condition. An N×M surface condition is defined by a number of third curves equal to N and a number of fourth curves equal to M. N and M are integers greater than one. The method also includes constructing an N×M surface under the N×M surface condition. The method also includes modifying the N×M surface to edit a drawing.

23 Claims, 4 Drawing Sheets

(56) References Cited

U.S. PATENT DOCUMENTS

| | | | | |
|---|---|---|---|---|
| 5,748,192 | A * | 5/1998 | Lindholm | 345/649 |
| 5,883,631 | A * | 3/1999 | Konno et al. | 345/423 |
| 6,014,148 | A * | 1/2000 | Tankelevich | 345/442 |
| 6,111,588 | A * | 8/2000 | Newell | 345/442 |
| 6,198,979 | B1 * | 3/2001 | Konno | 700/98 |
| 6,236,403 | B1 * | 5/2001 | Chaki et al. | 345/420 |
| 6,268,871 | B1 * | 7/2001 | Rice et al. | 345/442 |
| 6,323,863 | B1 * | 11/2001 | Shinagawa et al. | 345/441 |
| 6,563,501 | B2 * | 5/2003 | Sfarti | 345/442 |
| 6,603,473 | B1 * | 8/2003 | Litke et al. | 345/420 |
| 6,639,592 | B1 * | 10/2003 | Dayanand et al. | 345/419 |
| 6,731,280 | B1 * | 5/2004 | Koelman | 345/420 |
| 7,173,622 | B1 * | 2/2007 | McLaughlin | 345/473 |
| 7,196,702 | B1 * | 3/2007 | Lee et al. | 345/419 |
| 2002/0033821 | A1 * | 3/2002 | Sfarti | 345/423 |
| 2003/0189570 | A1 * | 10/2003 | Sfarti | 345/442 |

OTHER PUBLICATIONS

Hu, S.-M. et al., "Modifying the shape of NURBS surfaces with geometric constraints", Computer-Aided Design, Elsevier, vol. 33(12), Oct. 2001, pp. 903-912.*

Park, H., and Kim, K., "Smooth surface approximation to serial cross-sections", Computer-Aided Design, Elsevier, vol. 28(12), Dec. 1996, pp. 995-1005.*

Park, H., Kim, K., and Lee, S-C., "A method for approximate NURBS curve compatibility based on multiple curve fitting", Computer-Aided Design, Elsevier, vol. 32(4), Apr. 2000, pp. 237-252.*

Maya Unlimited 2.0, User's Guide © 1998-1999, 59 pages, http://caad.arch.ethz.ch/info/maya/manual/MasterIndex.html.*

Alias Wavefront Website Press Release Pages, Aug. 23, 1999, 8 pages.*

Alias Wavefront Website Qualification Chart Pages, May 10, 2000, 17 pages.*

* cited by examiner

APPARATUS, METHOD, AND SYSTEM FOR DRAFTING MULTI-DIMENSIONAL DRAWINGS

TECHNICAL FIELD OF THE INVENTION

This invention relates generally to drafting and more particularly to an apparatus, a method, and a system for drafting multi-dimensional drawings.

BACKGROUND OF THE INVENTION

Computer-aided drafting is a widely-used method of drawing devices and expressing concepts. Drafters generally create and edit drawings through the use of a drafting application that resides in a computer. A conventional drawing generated by using a drafting application is an assembly of discrete surfaces. For example, an isometric view of a cube may be illustrated by joining together three polygons at the appropriate edges.

The characteristics of a particular surface, such as its shape and orientation, are defined by curves. A curve is a graph of a mathematical function. Because a surface is defined by the curves, it is modified by adjusting, adding, or deleting the curves. Furthermore, the number of curves that define a surface identifies the method by which the surface is generated. For example, a surface that is generated by two non-intersecting curves that are joined at their ends by a third curve to define an enclosed space is referred to as being generated using a 2×1 method or a 1×2 method, depending on the reference point of the viewer.

In working with a surface, drawing packages impose modification restrictions on each surface based on the method that was used to generate the surface. Drawing packages also impose modification restrictions on each curve based on the mathematical characteristics of the equation that defines the curve. Because of these restrictions, a user must keep track of the method that was used to generate each surface that the user wants to modify. Also, the user must keep track of the mathematical characteristics of each curve that the user wants to modify. These requirements make it inconvenient and inefficient for the user to modify or edit a drawing.

SUMMARY OF THE INVENTION

According to one embodiment of the invention, a method for interfacing with a surface within a computer-aided drawing environment includes determining that a plurality of curves operable to define the surface constitute a P×1 surface condition. A P×1 surface condition is defined by a number of first curves equal to P and only one second curve. P is an integer greater than zero. The method also includes converting the P×1 surface condition into an N×M surface condition in response to determining that a plurality of curves constitute a P×1 surface condition. An N×M surface condition is defined by a number of third curves equal to N and a number of fourth curves equal to M. N and M are integers greater than one. The method also includes constructing an N×M surface under the N×M surface condition. The method also includes modifying the N×M surface to edit a drawing.

Some embodiments of the invention provide numerous technical advantages. Some embodiments may benefit from some, none, or all of these advantages. For example, according to one embodiment, drafting and editing efficiency is increased because a user is not required to switch between different methods of surface modification to edit a drawing. In another embodiment, drafting and editing efficiency is increased because the user is not required to keep track of the mathematics involved with any curves.

Other technical advantages may be readily ascertained by one of skill in the art.

BRIEF DESCRIPTION OF THE DRAWINGS

Reference is now made to the following description taken in conjunction with the accompanying drawings, wherein like referenced numbers represent like parts, in which.

DETAILED DESCRIPTION OF EXAMPLE EMBODIMENTS OF THE INVENTION

Example embodiments of the invention are best understood by referring to FIGS. 1A through 4B of the drawings, like numbers being used for like and corresponding parts of the various drawings.

Figure 1A:
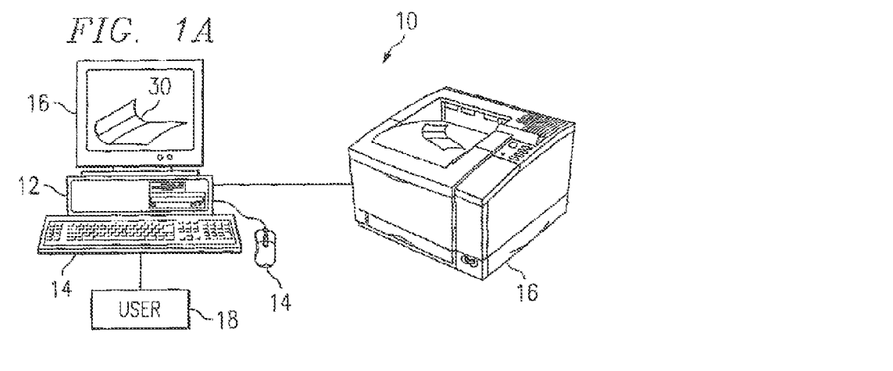
FIG. 1A is a schematic diagram illustrating an embodiment of a system for drafting drawings.

FIG. 1A is a schematic diagram illustrating an embodiment of a system 10 for drafting drawings that may benefit from the teachings of the present invention. System 10 includes a computer 12 that is coupled to one or more input devices 14 and one or more output devices 16. A user 18 has access to system 10 and may utilize input devices 14 to input data and generate and edit drawings 30 that may be displayed by any or all of output devices 16.

As shown in FIG. 1A, examples of input device 14 are a keyboard and a mouse; however, input device 14 may take other forms, such as a stylus, a scanner, or any combination thereof. Examples of output devices 16 are a monitor of any type and a printer; however, output device 16 may take other forms, such as a plotter. Any suitable visual display unit, such as a liquid crystal display ("LCD") or cathode ray tube ("CRT") display, that allows user 18 to view drawing 30, may be a suitable output device 16.

Figure 1B:
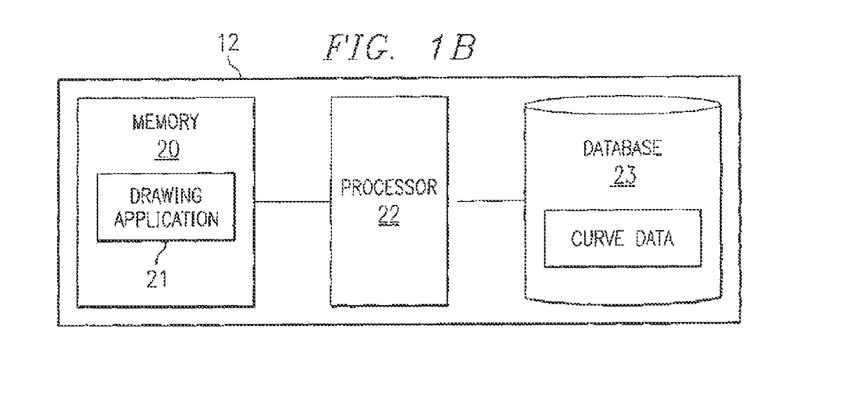
FIG. 1B is a block diagram illustrating a computer of FIG. 1A.

FIG. 1B is a block diagram of computer 12 for use in drafting according to one embodiment of the present invention. As illustrated, computer 12 includes a processor 22, a memory 20 storing a drawing application 21, and a database 23 for storing data related to drawing application 21 or other data.

Processor 22 is coupled to memory 20 and database 23. Processor 22 is operable to execute the logic of drawing application 21 and access database 23 to retrieve or store data relating to drawings. Examples of processor 22 are the Pentium™ series processors, available from Intel Corporation.

Memory 20 and database 23 may comprise files, stacks, databases, or other suitable forms of data. Memory 20 and database 23 may be random-access memory, read-only memory, CD-ROM, removable memory devices, or any other suitable devices that allow storage and/or retrieval of data. Memory 20 and databases 23 may be interchangeable and may perform the same functions.

Drawing application 21 is a computer program that aids in drafting drawings. Drawing application 21 may reside in any computer-readable storage medium, such as memory 20 or database 23. Drawing application 21 may be written in any suitable computer language, including C or C++. Drawing application 21 is operable to allow user 18 to draw, modify, edit, delete, or perform other drafting functions through input device 14 so that the desired drawing may be displayed on output device 16 and/or stored in database 23. One example of such drafting function is allowing user 18 to input curves having any shape and orientation and then generating a surface defined by the curves. User 18 may then join a plurality of these surfaces to form drawing 30 that has a desired shape. An example drawing application 21 that may incorporate the teachings of the invention is Studio Surfacing™, available from Unigraphics Solutions, Inc.

Figure 2A:
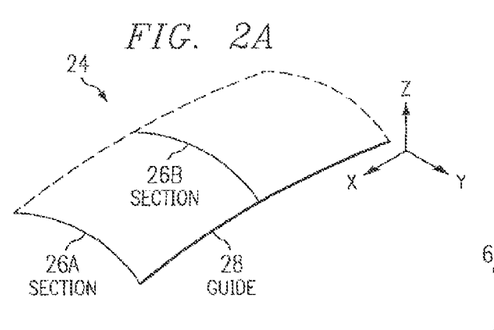
FIG. 2A is a schematic diagram illustrating an embodiment of a multi-dimensional surface that may be generated using the system of FIG. 1A.

FIG. 2A is a schematic diagram illustrating an embodiment of a surface 24 that may be used to generate a drawing, such as drawing 30. In this example, surface 24 is defined using curves 26A, 26B, and 28. In this example, curves 26A and 26B may be referred to as "section" curves, while curve 28 is referred to as a "guide" curve. The terms "section" and "guide" are names given to the different curves or sets of curves for convenience. For example, one or more curves that do not intersect with each other may be referred to as "section" curves, while another curve or set of curves that intersect with the "section" curve(s), but do not intersect with each other, may be referred to as "guide" curves. As such, the name of a particular curve depends on the point of view and any applicable drafting protocol. In this example, curves 26A and 26B are referred to as section curves, while curve 28 is referred to as a guide curve.

In one example of surface 24, as shown in FIG. 2A, the respective ends of section curves 26A and 26B intersect with an end and the middle portion of guide curve 28 to define surface 24. However, any portion of section curves 26A and 26B may intersect with any portion of guide curve 28 to define surface 24. For example, guide curve 28 may cut through the middle portions of section curves 26A and 26B to define multiple surfaces (not shown in FIG. 2A). Although FIG. 2A shows surface 24 defined by only two section curves 26A and 26B and one guide curve 28, a different number of section curves and a different number of guide curves intersecting at different portions of the respective curves may define surface 24. For example, three section curves and two guide curves may define a surface 24, where both of the guide curves intersect with the three section curves through the middle of the three section curves (not shown in FIG. 2A). Additionally, two or more section curves without any guide curves, and alternatively, two or more guide curves without any section curves, may define a surface 24 (not shown in FIG. 2A).

Surface 24 is generated by mathematically filling the space defined by section curves 26A, 26B, and guide curve 28. One way to fill the space to generate surface 24 may be by mathematically extending section curve 26A and section curve 26B toward each other along guide curve 28, so that the resulting appearance of that portion of surface 24 is smooth and free of abrupt breaks and sharp edges. Then section curve 26B may be extrapolated along the remaining portion of guide curve 28. This process creates the plane of surface 24 that appears to be free of breaks and sharp edges and intersects with section curves 26A and 26B and guide curve 28.

A method for generating a surface is named based on the surface condition in which the surface was generated. A surface condition refers to the respective numbers of section curves and guide curves that, in combination, may define a surface. In general, a surface condition is expressed in a U×V format, where "U" is the number of section curves and "V" is the number of guide curves. As such, the method used to generate a surface is also expressed in a U×V format. For example, the combination of two section curves 26A and 26B and one guide curve 28, with or without the resulting surface 24, constitutes a 2×1 surface condition. If there were an additional section curve, then that combination constitutes a 3×1 surface condition. If, contrary to the present example, one were to refer to curves 26A and 26B as "guide" curves and curve 28 as a "section" curve, then the combination of those curves constitutes a 1×2 surface condition. Whether a curve is named a "section" or a "guide" curve is of minor consequence, as long as the naming convention for each curve of a particular drawing stays consistent throughout the drawing. Because surface 24, as illustrated in FIG. 2A, was created in a 2×1 surface condition, surface 24 is said to have been generated using a 2×1 method. If, contrary to the present example, surface 24 were generated in a 3×1 surface condition, then surface 24 is said to have been generated using a 3×1 method.

A surface is generally referred to by the method that was used to generate the surface. For example, if the surface was generated using two section curves and two guide curves, then the surface is referred to as a 2×2 surface. Because a 2×2 surface is a surface that was generated using a 2×2 method, and because the name "2×2" of the method is based on the surface condition in which the 2×2 surface was generated, a 2×2 surface is necessarily under a 2×2 surface condition. However, the existence of a 2×2 surface condition does not necessarily mean there is a 2×2 surface.

Figure 2B:
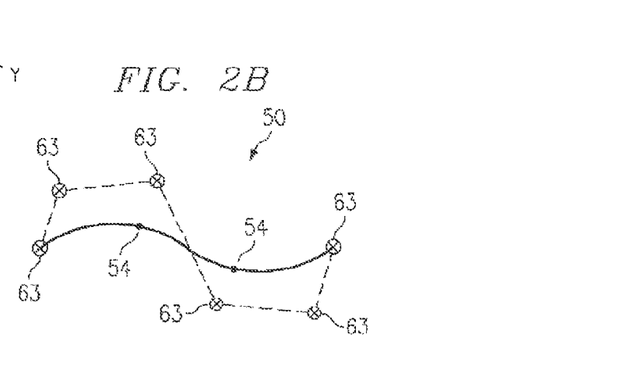
FIG. 2B is a schematic diagram illustrating one example of a curve that is used to define the surface of FIG. 2A.

FIG. 2B illustrates an embodiment of a representative example of a curve 50 that may be used to define a surface, such as surface 24 shown in FIG. 2A. Curve 50 is shown in FIG. 2B to illustrate the anatomy of a conventional curve, which facilitates the description of the present invention. In this example, curve 50 includes two knots 54 where the three segments of curve 50 are joined by their respective ends. Curve 50 also includes six poles 63 that are used to control the shape of curve 50. Although curve 50 is shown in FIG. 2B as having two knots 54 and six poles 63, curve 50 may have different numbers of knots 54 and poles 63. Also, the mathematical formula associated with curve 50 may be a first degree formula, a second degree formula, or a formula of a different order. Details of curve 50, knots 54, poles 63, and the degree of the mathematical formula associated with curve 50 are described below.

Curve 50 is a function of a polynomial mathematical formula and may be drawn in a multi-dimensional setting. A conventional curve, such as curve 50 shown in FIG. 2B, may be drawn using the Non-Uniform Rational B-spline ("NURB") method. The NURB method is a drafting method where a mathematical formula that represents the combination of several polynomial equations is graphed to draft a curve. Each polynomial equation represents one segment of the curve. The segments are joined to form the curve.

The degree, knot, and pole, as related to a NURB curve, are best explained using an example, such as the example of a two segment NURB curve formula provided below:

$$r(t)=(1-2t)^2 B_1+2t(2-3t)B_2+2t^2 B_3, \text{ for } 0<=t<0.5$$

$$r(t)=2(1-t)^2 B_2+2(1-t)(3t-1)B_3+(2t-1)^2 B_4, \text{ for } 0.5<=t<=1$$

In this mathematical formula, "t" parameterizes the curve from 0 to 1. "Parameterization," or "parameter," refers to the extent to which the curve is drawn according to the mathematical properties of the equation. A value of 0.5 for "t" corresponds to the location where the two curve segments meet, and that value is referred to as the knot position. As such, a "knot" is a position where two segments are joined. r(t) represents the x, y, and z position of the curve at parameter t in a three dimensional space defined by the x, y, and z coordinates. $B_1$, $B_2$, $B_3$, and $B_4$ are the x, y, and z values of the control positions of the curve. These control positions are referred to as the "poles" of the curve. By providing input for the poles, such as $B_1$=(0,0,1), $B_2$=(0,1,2), $B_3$=(0,1,3), and $B_4$=(2,0,1), user 18 may control the shape of the NURB curve. The highest polynomial order of the curve equation is referred to as the "degree" of the curve. As such, the degree for the example NURB curve formula provided above is two.

In general, a NURB curve is characterized by the degree, knot positions, and the number of poles that are associated with the NURB curve. One significant feature of the characterization of a NURB curve is that only the NURB curves with the same characteristics (in this example, the same degree, same number of knots, and same number of poles) are compatible with each other. If two or more curves are compatible with each other, then a user may modify all of the compatible curves using the same method of curve modification. For example, a set of compatible curves where each curve has four poles may be modified using the same method of inputting four values for each NURB equation associated with each of the compatible curves.

As described below, the characteristics associated with curves, such as the ones shown in conjunction with curve 50, should be the same for the curves to be compatible with each other.

Figures 2C, 2D:
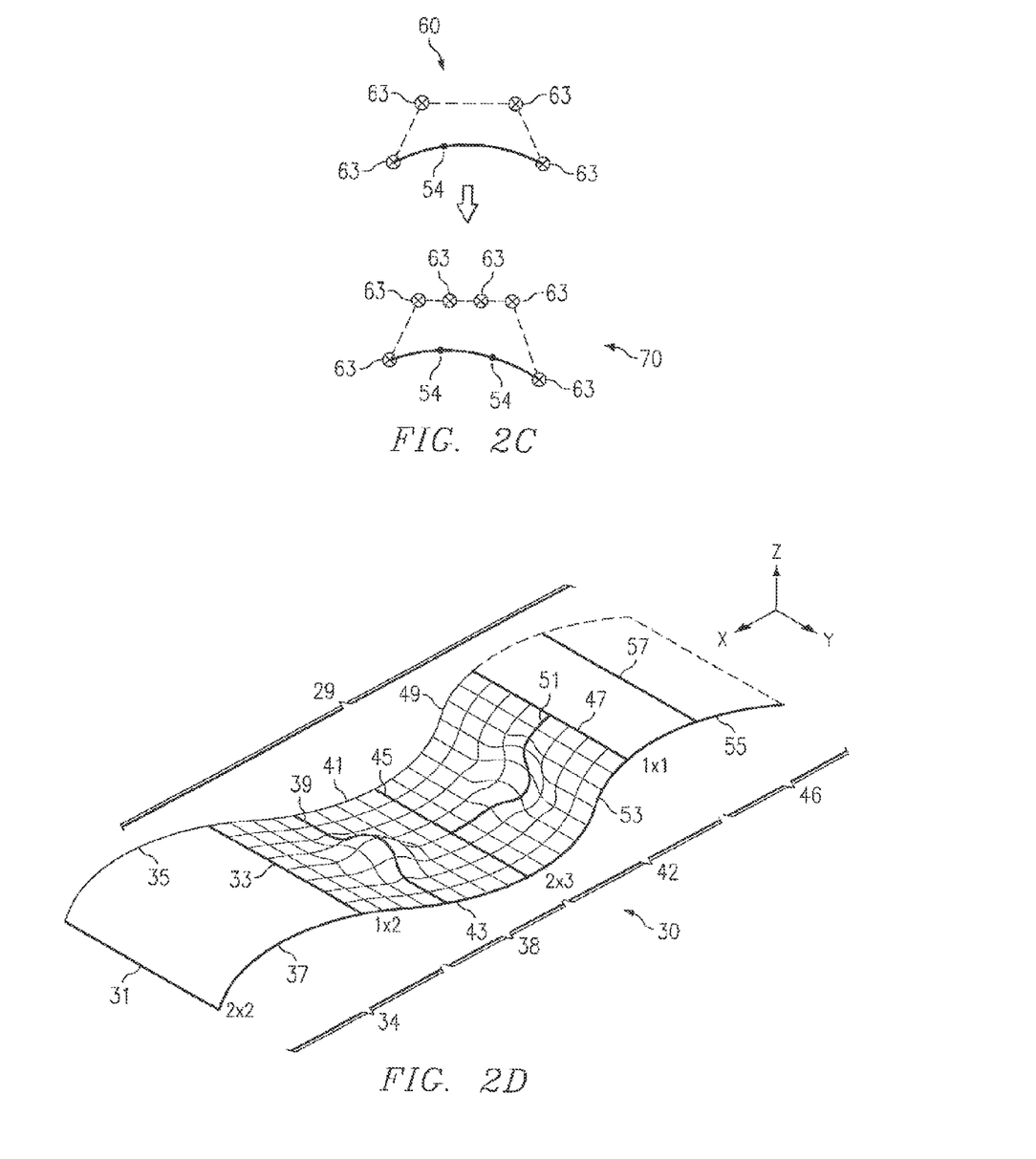
FIG. 2C is a schematic diagram illustrating one example of a curve that may be processed for compatibility with the curve shown in FIG. 2B.
FIG. 2D is a multi-dimensional drawing formed by joining a plurality of surfaces such as the one shown in FIG. 2A.

FIG. 2C illustrates an embodiment of a representative example of a curve 60 that is not compatible with curve 50 shown in FIG. 2B, and a curve 70, which is the result of processing curve 60 to be compatible with curve 50. Curve 60 and processed curve 70 illustrates the changes in the anatomy of a curve after the curve has been processed for compatibility. Curve 60 includes one knot 54, where the two segments of curve 60 are joined. Curve 60 also includes four poles 63. Because any difference in the number of knots, the degree, or the number of control poles between two curves render the two curves incompatible, curve 50 shown in FIG. 2B and curve 60 shown in FIG. 2C are not compatible. However, curve 60 may be converted to a curve 70 that is compatible with curve 50. Like curve 50, curve 70 has two knots 54 and six poles 63. Also, the mathematical formula associated with curve 70 has the same degree as the mathematical formula associated with curve 50. One method of such a conversion may be to generate a new mathematical formula that yields a curve having an appearance similar to curve 50 and having the same mathematical characteristics (knots, number of control poles, degree) as those associated with curve 50. The details of such a mathematical conversion process are known to one skilled in the art of drafting drawings using computers. As described below, compatible and non-compatible curves, such as curves 50, 60, and 70, are modified to edit one or more surfaces that form a drawing.

FIG. 2D is an example of a drawing 30 formed by a plurality of surfaces, such as surface 24 shown in FIG. 2A. In this example, drawing 30 includes a surface 34, a surface 38, a surface 42, and a surface 46, all of which are joined by their respective edges to present one continuous drawing that is free of breaks and sharp edges. A drawing that is free of breads and shape edges are referred to as being continuous. Other drawings may be formed by a different number, type, orientation, and shape of surfaces. For example, one or more of surfaces 34 through 46 may be transition surfaces that may aid in joining two or more sets of surfaces. Drawing 30 may also be a slab surface, which is a surface generated by adding different curves without necessarily creating discrete surfaces.

According to the teachings of the invention, drawing 30, as shown in FIG. 2D, is formed by a combination of surfaces 34 through 46, where each of surfaces 34 through 46 is defined using a different method. For example, surface 34 is defined by using a 2×2 method, because two section curves 31 and 33 and two guide curves 35 and 37 define surface 34. Surface 38 is defined using a 1×2 method, because one section curve 39 and two guide curves 41 and 43 define surface 38. Surface 42 is defined using a 2×3 method because two section curves 45 and 47 and three guide curves 49, 51, and 53 define surface 42. Surface 46 is defined using a 1×1 method, because one section curve 57 and one guide curve 55 define surface 46. However, other combinations of surfaces generated by the same or different methods may form drawing 30. For instance, drawing 30 may include surfaces that are generated using only a 3×2 method.

A conventional drawing package imposes modification restrictions on each surface of a drawing based on the surface condition of the surface. More specifically, conventionally, an N×M method may be used to modify surfaces having N×M, N×0 or 0×M surface conditions, but may not be used to modify surfaces having N×1 or 1×M surface conditions. Conversely, the N×1 method may be used to modify surfaces having N×1 or 1×M surface conditions, but may not be used to modify surfaces having an N×M surface condition. In this example, N and M are integers greater than 1. For example, if user 18 were to first edit surface 46 (a surface having a 1×1 surface condition, and thus an N×1 or 1×M surface condition) and then edit surface 42 (a surface having a 2×3 surface condition, and thus an N×M surface condition), user 18 must switch from using the N×1 method to the N×M method in order to modify surface 42. The necessity of switching methods for modifying different type of curves is inconvenient and inefficient for user 18.

A conventional drawing package also restricts modification of a surface based on the mathematical characteristics of each of the curves that define the surface. For example, user 18 must keep track of the number of poles associated with each of curves 29. If section curve 31 has three poles, user 18 must remember to enter three sets of values to modify section curve 31. If section curve 33 has five poles, then user 18 must remember to enter five sets of values to modify section curve 33. Otherwise, the modification may not be performed. Although the mathematical formulae associated with curves 29 may be replaced with new mathematical formulae that would make curves 29 compatible with each other, the complexity of each of the new mathematical formula may be significantly higher than the respective original mathematical formula. Higher complexity of mathematical formula increases the processing time for computer 12, and thus decreases drafting efficiency.

Figures 3, 4A:
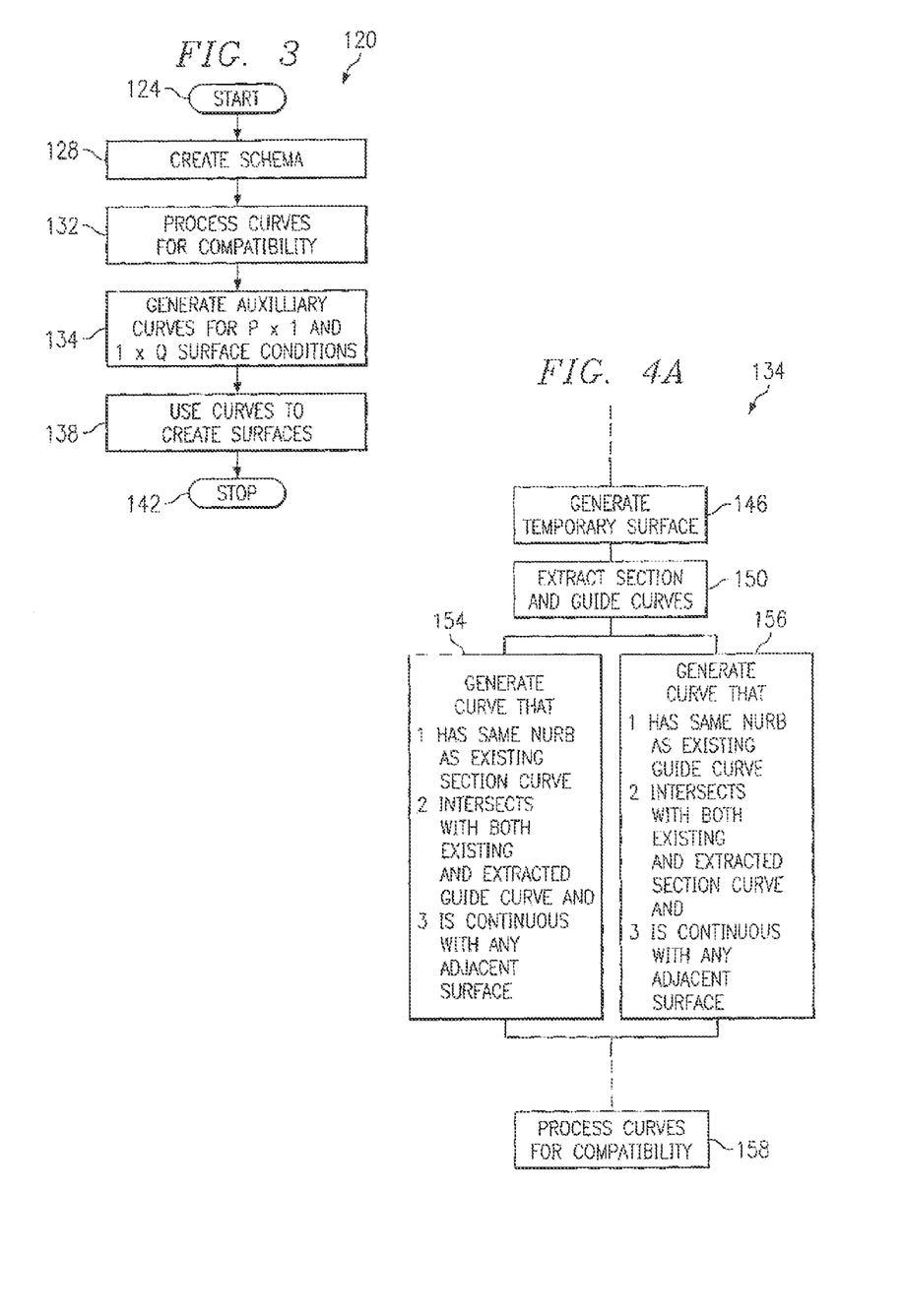
FIG. 3 is a flowchart illustrating an embodiment of a method for drafting multi-dimensional drawings according to the teachings of the invention.
FIG. 4A is a flowchart illustrating further details of an embodiment of a step of converting P×1 and 1×Q surface conditions into an N×M surface condition of the method shown in FIG. 3.

According to the teachings of the present invention, an apparatus, a system, and a method are provided that allow a user to edit the individual surfaces of a drawing regardless of the method with which the respective surfaces were generated or the surface condition of the respective surfaces. In one embodiment of the invention, editing efficiency is increased because the user, such as user 18, does not have to switch between different methods to edit different surfaces of the drawing, such as drawing 30. Editing efficiency may also be increased in some embodiments because the user does not have to keep track of the mathematical characteristics of each curve that is used to define a particular surface. In another embodiment of the invention, this increases drafting efficiency because the simplicity of mathematical formulae associated with curves is maintained, which minimizes processing time for a computer, such as computer 12. Additional details of example embodiments of the apparatus, the system, and the method are described in greater detail below in conjunction with FIGS. 3 through 4B.

FIG. 3 is a flowchart illustrating an embodiment of a method 120 of drafting drawings. In one embodiment, method 120 may be implemented using system 10 having a drawing package 21, such as Studio Surfacing™, available from Unigraphics Solutions, Inc. Drawing 30, shown in FIG. 2C, is used as a representative drawing to aid the description of method 120. However, method 120 may be used in conjunction with any type drawing.

Method 120 starts at step 124. At step 128, the drawing application 21 creates a schema in database 23 that is capable of managing data associated with all curves that will be drawn. Any schema through which any combination of curves may be managed is an acceptable schema. At step 132, drawing application 21 processes curves 29 so that the curves 29 are compatible with each other. In one embodiment, drawing application 21 makes curves 29 compatible by converting all of curves 29 into the same NURB format. In one embodiment, having the same NURB format refers to converting the mathematical formulae of all curves into polynomials having the same degree, the same knot sequence, and the same number of poles. In one embodiment, the mathematical formula associated with each of curves 29 are replaced with a new mathematical formula having the same degree, knot positions, and the number of poles. The new mathematical formula also yields a curve of a similar appearance as the respective one of curves 29 of the original mathematical formula. In another embodiment of the invention, the original mathematical formulae associated with curves 29 are mathematically adjusted rather than replaced so that the adjusted mathematical formulae of curves 29 have the same NURB format. The adjusted mathematical formulae also yield curves having an appearance similar to that of curves 29. In effect, the adjustment of formula may adjust the number of poles and knots of each curve 29 so that the numbers are uniform for all curves 29. The mathematical process associated with the adjustment is known to one skilled in the art of drafting drawings using computers.

Processing curves 29 to be compatible to each other is advantageous because user 18 is no longer required to keep track of the mathematical characteristics of each of curves 29 that requires modification. In another embodiment of the invention, adjusting, rather than replacing, the mathematical formulae maintains the simplicity of the mathematical formulae, which minimizes the increase of processing time for computer 12 and thus increases drafting efficiency.

At step 134, surfaces having P×1 or 1×Q surface conditions are converted into an N×M format. In this example, P and Q are integers greater than 0 that indicate the number of section curves and guide curves respectively. N and M are integers that are greater than 1. In this example, surface 38 has a 1×Q surface condition and surface 46 has either a P×1 or a 1×Q surface condition. As such, the surface conditions of surfaces 38 and 46 are converted into N×M surface conditions. In one embodiment, respective curves of surfaces 38 and 46 may be deleted and replaced with a number of section curves equal to N and a number of guide curves equal to M that, in combination, may define new surfaces having substantially the same characteristics as those of surfaces 38 and 46.

In another embodiment, drawing application 21 modifies surface conditions of surfaces 38 and 46 into the N×M format, rather than replacing surfaces 38 and 46 with new surfaces having the N×M surface conditions. Modification of surface conditions of surfaces 38 and 46 may occur by first generating one or more auxiliary curves for each of surfaces 38 and 46. Auxiliary curves are generated by using a sweep method referred to as "sweeping." Sweeping refers to mathematically extrapolating one curve along another curve. The generated auxiliary curves are processed so that the auxiliary curves are compatible with the existing and already processed curves. The sweep method is described in further detail below, in conjunction with FIGS. 4A and 4B. The auxiliary curves are generated so that any continuity condition, if applicable, is met. Continuity conditions are conditions that must be met so that the surface resulting from the auxiliary curve is joined with any adjacent surface in a manner that is free of breaks or sharp edges. For example, any auxiliary curve of surface 38 must be generated so that a surface defined by the auxiliary curve presents an appearance of continuity with surface 34 and surface 42. Further details of step 134 are described below in conjunction with FIGS. 4A and 4B.

At step 138, surfaces are generated using the respective curves and auxiliary curves that have been processed to be compatible with each other. Surfaces, as defined by the curves and auxiliary curves, are generated using any standard mathematical algorithm suitable for such a task. Method 120 concludes at step 142.

Converting all N×1, 1×M and M×N surface conditions into N×M surface conditions allows user 18 to modify each of surfaces 34 through 46 without keeping track of the particular method of surface generation or surface conditions. Making all of the existing curves 29 and auxiliary curves compatible allows user 18 to modify any curve without keeping track of the mathematics involved with each of curves 29 and auxiliary curves. Adjusting, rather than replacing, mathematical formulae in processing curves 29 and auxiliary curves for compatibility minimizes the increase in complexity of the compatible mathematical formulae. Thus, processing time for computer is not significantly increased and drafting efficiency is increased. Furthermore, method 120 improves the efficiency of drafting and editing because user 18 does not have to select different methods of modification for each of surfaces 34 through 46 based on the method by which each of surfaces 34 through 46 were generated or the respective surface conditions.

FIG. 4A is a flowchart illustrating further details of one embodiment of step 134 of method 120 shown in FIG. 3. In this embodiment, a P×1 surface condition is converted to an N×M surface condition by creating one or more auxiliary curves for any surface having a P×1 surface condition. However, step 134 illustrated in FIG. 4A may also be used to convert other surface conditions, such as 1×P and 1×Q, into N×M surface conditions. The details of step 134, as shown in FIG. 4A, are discussed below in conjunction with FIG. 4B, which is a schematic diagram illustrating further details of step 134.

Figure 4B:
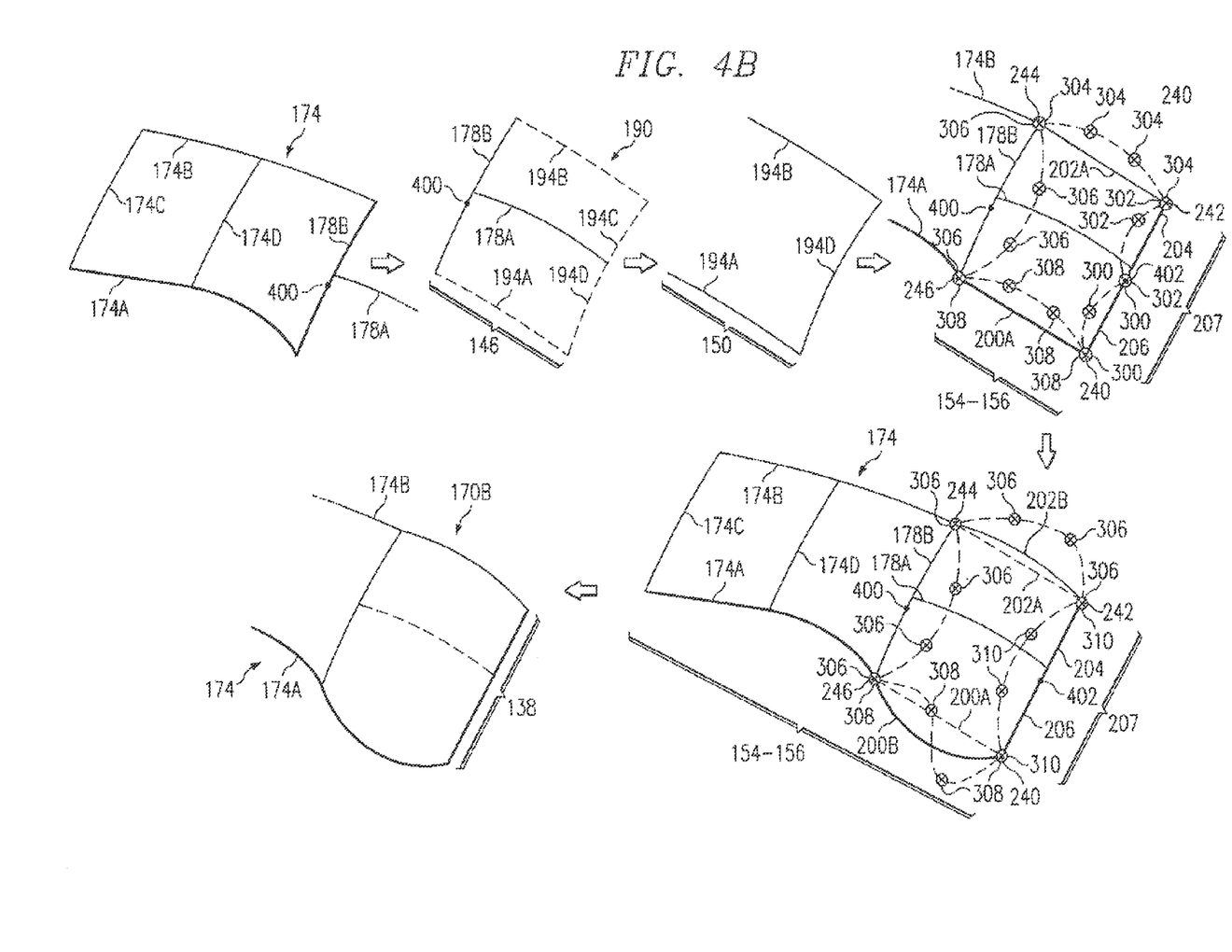
FIG. 4B is schematic diagram illustrating further details of the embodiment of the step of FIG. 4A.

A combination of a section curve 178A and a guide curve 178B, as shown in FIG. 4B, is a representative example of a P×1, 1×P, Q×1, or 1×Q surface condition. A surface 174 is adjacent to section curve 178A and guide curve 178B. Surface 174 is defined by section curves 174A and 174B and guide curves 174C and 174D. Guide curve 178B has a knot 400 where two segments of guide curve 178B are joined.

At step 146, a temporary surface 190 is generated by sweeping section curve 178A along guide curve 178B. In one embodiment, section curve 178A may be swept along guide curve 178B in both directions because section curve 178A intersects with the mid-portion of guide curve 178B. In another embodiment, guide curve 178B may be swept along section curve 178A. In one example, "sweeping" refers to mathematically extrapolating a curve along another intersecting curve so that the extrapolation creates an appearance of a continuous surface. However, sweeping may be performed using any appropriate mathematical algorithm known to one skilled in the art. The resulting temporary surface 190 is a series of section curves and/or guide curves that fill the spaces defined by section curve 178A and guide curve 178B.

At step 150, one or more section curves and one or more guide curves that fill the space defined by section curve 178A and guide curve 178B are extracted from temporary surface 190. In this example, section curves 194A and 194B and guide curves 194C and 194D are extracted. However, any combination of section curves and/or guide curves may be extracted. At step 156, an auxiliary curve is generated for each of the extracted guide curves. In this example, an auxiliary curve 204 and an auxiliary curve 206 are generated using section curves 194C and 194D respectively as references. In this example, for illustrative purposes, auxiliary curves 204 and 206 are not compatible with existing guide curve 178B. However, auxiliary curves 204 and 206 may be compatible with existing guide curve 178B in other examples. In this example, auxiliary curves 204 and 206 are not compatible with existing guide curve 178B because auxiliary curves 204 and 206 each have three poles (poles 302 and 300 respectively), whereas existing guide curve 178B has four poles 306. Also, neither auxiliary curves 204 nor 206 have knots. Continuity is not an issue here because neither auxiliary curves 204 nor 206 have adjacent surfaces.

In one embodiment, auxiliary curves 204 and 206 are processed for compatibility with existing guide curve 178B by joining auxiliary curves 204 and 206 at a knot 402 to generate an auxiliary curve 207. Auxiliary curve 207 has the same mathematical characteristics as that of existing guide curve 178B. For example, auxiliary curve 207 has four poles 310, like existing guide curve 178B that also has four poles 306. Auxiliary curve 207 has one knot 402, like existing guide curve 178B that also has one knot 400. The mathematical formula (either a new formula or one that was adjusted from the formulae associated with auxiliary curves 204 and 206 respectively) associated with auxiliary curve 207 also has the same degree as that of existing guide curve 178B. Therefore, auxiliary curve 207 has the same NURB property of existing guide curve 178B. Auxiliary curve 207 intersects with existing section curve 178A, and extracted section curve 194A and 194B. As shown in FIG. 4B, auxiliary curve 207 intersects with existing section curve 178A at an intersection 248. Also, auxiliary curve 207 intersects with extracted section curve 194A and 194B at an intersection 240 and 242 respectively.

At step 154, which may be performed before, during, or after step 156, an auxiliary curve is generated for each extracted section curve. An auxiliary curve 200A and an auxiliary curve 202A are generated using section curves 194A and 194B respectively as references. In this example, auxiliary curves 200A and 202A are compatible with existing section curve 178A, which has four poles 306. Because auxiliary curve 200A is compatible with existing section curve 178A, auxiliary curve 200A includes four poles 308. For the same reason, auxiliary curve 202A also includes four poles 304. However, in this example, for illustrative purposes, auxiliary curve 200A is not continuous with existing section curve 174A because there is a sharp corner at an intersection 246 between section curve 174A and auxiliary curve 200A. Auxiliary curve 202A is also not continuous with existing section curve 174B because there is a sharp corner at an intersection 244 between section curve 174B and auxiliary curve 202A.

To process auxiliary curve 200A so that it is continuous with existing section curve 174A, poles 308 are adjusted, as shown in FIG. 4B, to generate an auxiliary curve 200B. To process auxiliary curve 202A so that it is continuous with existing section curve 174B, poles 306 are adjusted, as shown in FIG. 4B, to generate an auxiliary curve 202B. By adjusting poles 308 and 306, the resulting auxiliary curves 200B and 202B are joined with existing section curves 174A and 174B free of sharp edges. Thus, auxiliary curves 200B and 202B have met the condition of continuity with respect to existing section curves 174A and 174B respectively.

Auxiliary curves 200B and 202B have the same NURB property of existing section curve 178A, intersect with both existing and extracted guide curves (which, in this example, are existing guide curve 178B, extracted guide curve 207, respectively), and are continuous with adjacent surface 174, in this example. As shown in FIG. 4B, auxiliary curve 200B intersects with existing guide curve 178B at an intersection 246 and intersects with extracted guide curve 207 at an intersection 240. Furthermore, auxiliary curve 200B is continuous with adjacent curve 174A because there is no break in continuity at intersection 246. As shown in FIG. 4B, auxiliary curve 202B intersects with existing guide curve 178B at an intersection 244 and intersects with extracted guide curve 207 at an intersection 242. Furthermore, auxiliary curve 202B is continuous with adjacent curve 174A because there is no break in continuity at intersection 244.

In one embodiment, auxiliary curves 200B, 202B, and 207 may be generated so that they are not in the same NURB format as the existing section and guide curves. In such a case, drawing application 30 processes auxiliary curves 200B, 202B, and 207 so that they are compatible with all of the existing curves at step 158. Once auxiliary curves 200B, 202B, and 207 are generated and are processed to be compatible with existing section curve 178A and guide curve 178B, auxiliary curves 200B, 202B, and 207, along with any other existing curves, such as existing section curve 178A and existing guide curve 178B, are mathematically interpreted to define a surface 170, which is a surface having a 2×3 surface condition. Converting P×1 and 1×P surface conditions into the N×M surface condition using either auxiliary curves or the replacement method is advantageous because it allows user 18 to work with any type of surfaces regardless of the surface condition or the method by which the surfaces were generated.

The apparatus, the system, and the method described in detail above offers a solution to working with multidimensional graphics designing. One benefit from some embodiments of the invention is that it offers the designer a flexible way of working with any type of surfaces that form any type drawings, regardless of the methods by which the surfaces were generated. Another benefit from some embodiments of the invention is that user 18 is not required to keep track of the mathematics involved with any curves. Furthermore, user 18 is not required to switch between different methods of surface generation for modification. Therefore, user efficiency in editing and generating surfaces is increased.

Although the present invention has been described in detail, it should be understood that various changes, substitutions, and alterations can be made hereto without departing from the spirit and scope of the invention as defined by the appended claims.

What is claimed is:

1. A method for interfacing with multiple surfaces within a computer-aided drawing environment, comprising:

using a computer system, determining that a first surface of a drawing comprises a first plurality of curves constituting a P×1 surface condition, a P×1 surface condition being defined by a number of first curves equal to P and only one second curve, wherein P is an integer greater than zero;

using the computer system, determining that a second surface of a drawing comprises a second plurality of curves constituting a first N×M surface condition, a first N×M surface condition being defined by a number of third curves equal to N and a number of fourth curves equal to M, wherein N and M are integers greater than one;

using the computer system, converting the P×1 surface condition of the first surface into a second N×M surface condition to match the N×M surface condition of the second surface, the second N×M surface condition being defined by a number of fifth curves equal to N and a number of sixth curves equal to M, wherein N and M are integers greater than one;

using the computer system, constructing an N×M surface under the second N×M surface condition; and modifying the second N×M surface to edit a drawing.

2. The method of claim 1, wherein converting the P×1 surface condition of the first surface into the second N×M surface condition further comprises generating at least one auxiliary curve that is substantially continuous with any adjoining surfaces of the first surface and compatible with the number of first curves and the only one second curve that define the P×1 surface condition.

3. The method of claim 1, wherein converting the P×1 surface condition of the first surface into the second N×M surface condition further comprises replacing the P×1 surface condition with the second N×M surface condition.

4. The method of claim 1, wherein converting the P×1 surface condition of the first surface into the second N×M surface condition further comprises generating an N×M surface condition defined by the third and fourth curves such that the third and fourth curves are defined by mathematical equations all having an order no greater than mathematical equations defining the first and second curves.

5. The method of claim 1, and further comprising processing the first curves and the second curve so that each one of the first curves and the second curve are compatible with each other of the first curves and the second curve.

6. The method of claim 1, and further comprising editing the drawing, at least in part, by modifying additional surfaces having the first N×M surface condition of the second surface.

7. A method for interfacing with a surface within a computer-aided drawing environment, comprising:

using a computing system, determining that a first surface of a drawing comprises a first plurality of curves constituting a P×1 surface condition, a P×1 surface condition being defined by a number of first curves equal to P and only one second curve, wherein P is an integer greater than one;

in response to determining that the plurality of curves constitute a P×1 surface condition and using the computing system, converting the P×1 surface condition into an N×M surface condition by generating at least one auxiliary curve that is substantially continuous with any adjoining surfaces of the first surface and compatible with the number of first curves and the only one second curve that define the P×1 surface condition, the N×M surface condition being defined by a number of third curves equal to N and a number of fourth curves equal to M, wherein N and M are integers greater than one, wherein each of the third and fourth curves are of the same mathematical degree as the first and second curves to be compatible with the first and second curves;

using the computing system, constructing an N×M surface under the N×M surface condition; and modifying the N×M surface to edit a drawing.

8. The method of claim 7, wherein converting the P×1 surface condition into the N×M surface condition further comprises replacing the P×1 surface condition with the N×M surface condition.

9. The method of claim 7, wherein converting the P×1 surface condition into the N×M surface condition further comprises generating an N×M surface condition defined by the third and fourth curves such that the third and fourth curves are defined by mathematical equations all having an order no greater than mathematical equations defining the first and second curves.

10. The method of claim 7, further comprising processing the first curves and the second curve so that each one of the first curves and the second curve are compatible with each other of the first curves and the second curve.

11. The method of claim 7, further comprising editing the drawing, at least in part, by modifying additional surfaces having the first N×M surface condition.

12. An apparatus for interfacing with a surface within a computer-aided drawing environment, comprising:

a software program stored on a non-transitory computer readable medium and operable, when executed on a processor, to:

determine that a first surface of a drawing comprises a first plurality of curves constituting a P×1 surface condition, the P×1 surface condition being defined by a number of first curves equal to P and only one second curve, wherein P is an integer greater than zero;

determine that a second surface of the drawing comprises a second plurality of curves constituting a first N×M surface condition, a first N×M surface condition being defined by a number of third curves equal to N and a number of fourth curves equal to M, wherein N and M are integers greater than one;

convert the P×1 surface condition of the first surface into a second N×M surface condition to match the N×M surface condition of the second surface, the second N×M surface condition being defined by a number of fifth curves equal to N and a number of sixth curves equal to M, wherein N and M are integers greater than one;

generate an N×M surface under the second N×M surface condition; and modify the generated N×M surface.

13. The apparatus of claim 12, wherein the software program is further operable to convert the P×1 surface condition of the first surface into the second N×M surface condition by generating at least one auxiliary curve that is substantially continuous with any adjoining surfaces of the first surface and compatible with the number of first curves and the only one second curve that define the P×1 surface condition.

14. The apparatus of claim 12, wherein the software program is further operable to replace the P×1 surface condition with the second N×M surface condition.

15. The apparatus of claim 12, wherein the software program is further operable to convert the P×1 surface condition of the first surface into the second N×M surface condition by generating an N×M surface condition defined by the third and fourth curves such that the third and fourth curves are defined by mathematical equations all having an order no greater than mathematical equations defining the first and second curves.

16. The apparatus of claim 12, wherein the software program is further operable to process the first curves and the second curve so that each one of the first curves and the second curve are compatible with each other of the first curves and the second curve.

17. The apparatus of claim 12, wherein the software program is further operable to modify additional surfaces having the first N×M surface condition.

18. A system for interfacing with a surface within a computer-aided drawing environment, comprising:
   a computer system having a display unit and an input device;
   a computer readable medium coupled to the computer system, the computer readable medium comprising a software program operable to:
      determine that a first surface of a drawing comprises a first plurality of curves constituting a P×1 surface condition, the P×1 surface condition being defined by a number of first curves equal to P and only one second curve, wherein P is an integer greater than one;
      convert the P×1 surface condition of the first surface into a N×M surface condition, the N×M surface condition being defined by a number of third curves equal to N and a number of fourth curves equal to M, wherein N and M are integers greater than one, the third and fourth curves mathematically filling the space of the surface plane defined by the first curves and the only one second curve;
      construct an N×M surface under the N×M surface condition; and
      enable edits to the drawing, at least in part, by enabling modifications to the constructed N×M surface.

19. The system of claim 18, wherein the software program is further operable to convert the P×1 surface condition of the first surface into the N×M surface condition by generating at least one auxiliary curve that is substantially continuous with any adjoining surfaces of the first surface and compatible with the number of first curves and the only one second curve that define the P×1 surface condition.

20. The system of claim 18, wherein the software program is further operable to convert the P×1 surface condition of the first surface into the N×M surface condition by generating an N×M surface condition to replace the P×1 surface condition.

21. The system of claim 18, wherein the software program is further operable to convert the P×1 surface condition of the first surface into the N×M surface condition by generating an N×M surface condition defined by the third and fourth curves such that the third and fourth curves are defined by mathematical equations all having an order no greater than mathematical equations defining the first and second curves.

22. The system of claim 18, wherein the software program is further operable to process the first curves and the second curve so that each one of the first curves and the second curve are compatible with each other of the first curves and the second curve.

23. The system of claim 18, wherein the software program is further operable to modify additional surfaces having the first N×M surface condition.

* * * * *